US007737832B2

(12) United States Patent
Baratoff et al.

(10) Patent No.: US 7,737,832 B2
(45) Date of Patent: Jun. 15, 2010

(54) ASSISTANCE SYSTEM FOR MOTOR VEHICLES

(75) Inventors: Gregory Baratoff, Wangen-Feld (DE); Ludwig Ertl, Donaustauf (DE); Thorsten Köhler, Lindau (DE); Martin Pellkofer, Pentling (DE); Andre Rieder, Wasserburg (DE)

(73) Assignee: Siemens Aktiengesellschaft, Munich (DE)

( * ) Notice: Subject to any disclaimer, the term of this patent is extended or adjusted under 35 U.S.C. 154(b) by 579 days.

(21) Appl. No.: 11/628,208

(22) PCT Filed: May 13, 2005

(86) PCT No.: PCT/EP2005/052224

§ 371 (c)(1), (2), (4) Date: Dec. 1, 2006

(87) PCT Pub. No.: WO2005/119624

PCT Pub. Date: Dec. 15, 2005

(65) Prior Publication Data

US 2008/0024284 A1 Jan. 31, 2008

(30) Foreign Application Priority Data

Jun. 1, 2004 (DE) ....................... 10 2004 026 590

(51) Int. Cl.
*B60Q 1/00* (2006.01)

(52) U.S. Cl. ....................... 340/435; 340/988; 700/300; 700/301

(58) Field of Classification Search .............. 340/425.5, 340/435, 436, 901, 937, 988; 701/300, 301
See application file for complete search history.

(56) References Cited

U.S. PATENT DOCUMENTS

| | | | | |
|---|---|---|---|---|
| 5,835,028 | A | 11/1998 | Bender et al. | |
| 6,201,493 | B1 * | 3/2001 | Silverman | 342/20 |
| 6,370,475 | B1 | 4/2002 | Breed et al. | |
| 6,732,021 | B2 * | 5/2004 | Matsumoto et al. | 701/1 |
| 6,741,186 | B2 * | 5/2004 | Ross | 340/901 |
| 6,924,731 | B2 * | 8/2005 | Fallon et al. | 340/309.16 |

(Continued)

FOREIGN PATENT DOCUMENTS

DE 1 042 375 10/1958

(Continued)

*Primary Examiner*—Davetta W Goins
*Assistant Examiner*—Edny Labbees
(74) *Attorney, Agent, or Firm*—Laurence A. Greenberg; Werner H. Stemer; Ralph E. Locher

(57) ABSTRACT

An assistance system for motor vehicles has at least one monitoring unit monitoring a space external to a vehicle, in particular in a direction of travel of the motor vehicle, with a warning zone being defined in the monitored external space on each side of a lane. The warning zone is delimited by an earliest warning line and a latest warning line encompassing the respective lane marking or, as the case may be, boundary. An evaluation unit receives the data transmitted by the monitoring unit and generates a warning signal for an acoustic, visual and/or haptic warning and/or a steering intervention if the evaluation unit detects that a defined warning threshold lying within the warning zone is exceeded. The warning signal is issued only as a function of further planned driver-adaptive conditions.

27 Claims, 1 Drawing Sheet

U.S. PATENT DOCUMENTS

| | | | |
|---|---|---|---|
| 7,149,653 B2 | 12/2006 | Bihler et al. | |
| 2002/0087255 A1 | 7/2002 | Jindo et al. | |
| 2002/0198632 A1 | 12/2002 | Breed et al. | |
| 2005/0273261 A1 * | 12/2005 | Niwa et al. | 701/301 |

FOREIGN PATENT DOCUMENTS

| | | | | |
|---|---|---|---|---|
| DE | 100 42 375 | A1 | | 5/2002 |
| DE | 101 53 987 | A1 | | 5/2003 |
| FR | 2 813 423 | | | 3/2002 |
| JP | 11025397 | A | | 1/1999 |
| JP | 11034773 | A | | 2/1999 |
| JP | 2003104147 | A | | 4/2003 |
| WO | WO 03/004023 | | * | 5/2003 |
| WO | 03/104023 | A2 | | 12/2003 |

* cited by examiner

FIG 1
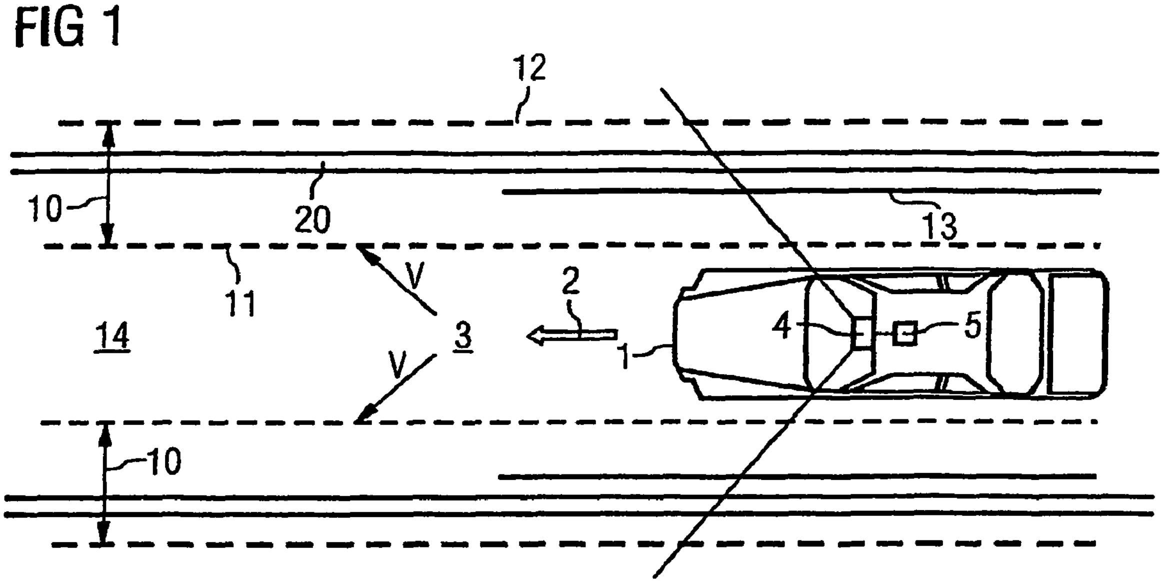
FIG 2
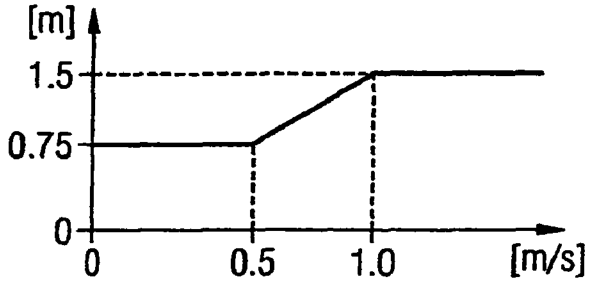
FIG 3
| Approach Speed (V) | Position within driving lane (20) |
|---|---|
| 0.0<V<0.5 m/s | 0.75 m |
| 0.5<V≤1.0 m/s | 1.5 sec×V m/sec |
| 1.0 m/s<V | 1.5 m |

ASSISTANCE SYSTEM FOR MOTOR VEHICLES

BACKGROUND OF INVENTION

Field of the Invention

The invention relates to an assistance system for motor vehicles having at least one monitoring unit monitoring the external space, in particular in the direction of travel of the motor vehicle.

Intelligent advanced driver assistance systems (ADAS) are assuming an increasingly important role in modern and future motor vehicles. Motor vehicles of the future will include for example monitoring units such as camera systems as aids which monitor the external space, for example in the direction of travel of the motor vehicle. In this case first known system applications are based on lane detection. These are:

- a lane departure warning (LDW), in particular acoustic, visual and/or haptic; and
- a lane keep (LK) steering intervention which keeps the vehicle in the lane.

One, if not the most common, cause of accidents, in particular on cross-country journeys, is the vehicle's drifting outside of the driving lane. Reasons for this include, for example, microsleep, attention lapse or searching for objects in the vehicle and similar. The lane departure warning, in particular by means of LDW systems, is intended to prevent this.

An already very far advanced draft of an ISO standard No. CD17361, which is likely to change only very little in content in the future, already exists for LDW systems:

If the wheels of the vehicle are located within a defined "warning zone" 10, a warning must be issued; otherwise no warning must be issued (cf. FIG. 1). The defined warning zone 10 is delimited by an "earliest warning line" 11, and a "latest warning line" 12. The exact time of the warning within the zone 10 is determined by a definable "warning threshold" 13. Between the defined warning zones lies the warning-free zone of a roadway lane 14, referred to as the "no warning zone".

For passenger vehicles, the latest warning line 12 is at 0.3 m outside the lane marking 20, referred to as the "lane boundary". The position of the earliest warning line 11 is dependent on the approach velocity ("rate of departure") V of the vehicle 1 to the lane boundary 20. FIG. 2 and FIG. 3 show the respective position in detail. These are 0.75 m at V less than 0.5 m/s, a linear increase from 0.75 to 1.5 m at V between 0.5 to 1 m/s and 1.5 m at V greater than 1 m/s.

The draft of the ISO standard specifies conditions under which the position of the warning threshold within the defined warning zone can be moved or the warning totally suppressed.

The warning can be suppressed for example in the following cases:

- the driver operates the turn signal lever;
- the driver operates the brake pedal;
- the driver performs a high-priority maneuver such as, for example, an avoidance or braking maneuver;
- the speed of the vehicle is below a threshold (e.g. 17 m/s=61.2 km/h), which serves to suppress false alarms during city center driving; and/or
- if other warnings are already being issued, which serves to suppress multiple warnings.

According to the ISO draft, the position or placement of the warning threshold 13 can be moved within the defined warning zone 10 in the following cases:

- once due to a manual adjustment by the driver; and/or
- in a curve further toward the outside in order to avoid warnings during curve cutting.

Finally the system can be activated and deactivated as a whole by the driver.

SUMMARY OF THE INVENTION

The object underlying the present invention is to provide an improved assistance system avoiding the above-cited disadvantages. In particular measures are to be specified which increase the sensitivity of the system and to that extent the acceptance of systems of this kind.

This object is achieved according to the invention by the features of the independent claim 1.

Advantageous embodiments and developments which can be used individually or in combination with one another are the subject matter of the dependent claims.

The invention is based on generic assistance systems for motor vehicles having at least one monitoring unit monitoring the external space, in particular in the direction of travel of the motor vehicle. In this arrangement a warning zone is defined in the monitored external space on either side of the driving lane, which warning zone is delimited by an earliest warning line and a latest warning line encompassing the respective lane marking or boundary. An evaluation unit for the data transmitted by the monitoring unit generates a warning signal for an acoustic, visual and/or haptic warning and/or a steering intervention if said evaluation unit detects that a defined warning threshold lying within the warning zone is exceeded.

The assistance system according to the invention uses the generic system as a basis to the extent that the warning signal for a warning and/or an intervention in the steering is issued only as a function of further planned driver-adaptive conditions.

The issuing of warnings and/or steering interventions as a function of planned driver-adaptive conditions advantageously increases in particular the acceptance of systems of said kind, since they appear to address the needs of the driver and to that extent are perceived as more convenient.

For example, the issuing of the warning signal is preferably suppressed during a driver-selectable time period after the driver first starts driving the vehicle. Experience shows that any warnings during, for example, the first hour of driving tend to be perceived as irritating to the (still) alert driver. First signs of tiredness also do not set in until after an hour or more has elapsed.

Alternatively or in addition hereto, the issuing of warning signals is suppressed in a range dependent on the time of day. For example, the assistance system according to the invention issues warnings from 5 o'clock in the evening until 7 o'clock in the morning preferably immediately, whereas from 7 am until 5 pm the warning will be issued only one hour after the start of the journey. These time intervals can also be adaptably selected by the user, an aspect which is advantageous not only for shift workers for example.

According to the invention the position of the warning threshold is preferably moved over time from a defined starting position in the direction of the earliest warning line. In particular the warning threshold can begin to be moved after an adjustable period of time and/or the warning threshold is moved continuously over the set period of time from an outer position within the permitted warning zone in the direction of the earliest warning line. The end position for the placement of the warning threshold would then advantageously be a defined threshold position ("default position") which can be adjusted by the driver or vehicle manufacturer.

The period of time for the suppression of the warning or, as the case may be, the moving of the position of the warning threshold is preferably also dependent on the weather and the lighting conditions.

The weather can preferably be assessed on the basis of the time of day and/or—provided the monitoring unit includes a camera system—on the basis of the camera parameters set by the exposure controller such as exposure time, gain, shape of the characteristic curve, etc. The assessment can be stored in the device in the form of a table for example. If the exposure times are to be rated as long in relation to the time of day, i.e. "dark" lighting conditions prevail, the warning threshold can be moved in the direction of the earliest warning line, which is equivalent to an increase in sensitivity.

The starting position and/or the change in position of the warning threshold can also beneficially be moved as a function of the calendar date.

Alternatively or in addition hereto, the position of the warning threshold is moved in particular as a function of the activation of a windshield wiper lever or the signal from a rain sensor. These settings or values are present in modern motor vehicles on the CAN bus of the vehicle, for example, as a result of which the sensitivity of the assistance system can advantageously be increased still further.

In another preferred embodiment of the invention the number of times the warning threshold is exceeded, per minute for example, or in another defined time unit, is measured and a warning signal issued only if a further threshold is exceeded, for example 2 violations per minute.

Alternatively or in addition hereto, each time the warning threshold or the further threshold is exceeded, the position of the warning threshold is moved in the direction of the earliest first warning line, which advantageously leads to a more sensitively set warning threshold.

In another preferred embodiment of the invention the starting position and/or the change in position of the warning threshold can be adjusted individually to match a defined driver. For example, the position of the vehicle on the driving lane is measured over an adjustable period of time and evaluated statistically. The behavior of the driver can advantageously be derived herefrom. Depending on the driver, the warning threshold is set more to "sensitive" or more to "insensitive". This results in a more sensitive setting for drivers who habitually drive close to the center of the driving lane than for drivers who wander more in the lane. Advantageously, the adjustment described can essentially be performed within certain limits in order to register different states of the same driver. Example: In the morning the driver is still fresh and drives precisely in the lane. In the evening the driver is tired and reacts only after drifting a relatively long way from the center of the lane. Furthermore the adjustment described can be carried out for each driver individually. The individual data values are then stored in the system. Following identification of the driver (e.g. based on the key used, the fingerprint and/or by means of face recognition), the driver-specific parameterization is performed.

In a further embodiment of the system the warning threshold is set as a function of the width of the driving lane. On narrow driving lanes the warning threshold is placed farther out ("more insensitively"), while on wide driving lanes it is set further in ("more sensitively").

In a further embodiment of the system the warning threshold is set as a function of the type of road. If it is a country road with oncoming traffic, the system is set more sensitively on the left-hand side of the driving lane; if the road is a multi-lane expressway (detected adjacent lanes with same direction of travel), the system can be set less sensitively. For this an additional vehicle detection means using the camera would be necessary.

In a further embodiment of the system the area next to the vehicle, i.e. for example only on the left, only on the right, or on both left and right, is monitored by means of a further camera or another sensor. In this case the range can be approx. 9 m (blind spot) or more (up to 150 m). If at least one vehicle is detected near the vehicle fitted with the assistance system or at least one vehicle is approaching quickly from behind in another lane or in the same lane, the warning threshold can be set more sensitively, which is advantageously equivalent to a risk-adaptive parameterization.

In a further embodiment of the system a camera or another, system detects vehicles ahead, determines the distance and the speed relative thereto and in this way recognizes overtaking maneuvers in order to suppress warnings. Another similar scenario is the maneuver to get back into lane, following an overtaking maneuver for example.

In a further embodiment of the system signs of tiredness in the driver that are supplied by other sensors are evaluated. If the driver shows signs of tiredness, the system can be set "more sensitively". Known sensors/methods for detecting tiredness are: interior camera for detecting blinking of the eyelid, frequency of movement of accelerator, clutch, brake and steering wheel or similar.

In a further embodiment of the system, depending on the strategic alignment of the LDW system, in the case of an activated handsfree device the system is either deactivated entirely or also only in particular for acoustic warnings (since the driver is not asleep) or selectively only warning signals for visual warnings are issued (since the driver's attention has still possibly lapsed due to a conversation).

Further reasons for a possibly temporary suppression of warnings in addition to the operation of a telephone are: operation of onboard computer, radio, air conditioning system or other more complex operations, i.e. in situations where the driver is demonstrably not close to falling asleep.

In a further embodiment of the system the warning can be deactivated and/or modified in curves essentially for avoiding false warnings (curve cutting), especially since curve driving necessarily demands increased attentiveness on the part of the driver in any case. For example, the radius of the curve ahead can be detected and it can be estimated by means of driving dynamics models whether the vehicle would be able to negotiate the curve at the current speed. In the specific danger situation a warning could also be issued before the warning threshold was reached and/or an intervention made in the steering, braking, etc. of the motor vehicle.

Compared to the known assistance systems, an important improvement is advantageously made with the present invention in that the taking into account of driver-adaptive conditions advantageously increases the acceptance of systems of this type and leads to economically interesting products.

BRIEF DESCRIPTION OF THE DRAWINGS

Additional details and further advantages of the invention are described below with reference to a preferred exemplary embodiment as well as to the accompanying drawing, in which:

FIG. 1 shows a schematic representation of a motor vehicle fitted with an assistance system according to the invention in its vehicular environment;

FIG. 2 shows the varying distance of the earliest warning line from the lane boundary as a function of the rate of departure of the motor vehicle; and FIG. 3 shows the variables corresponding to FIG. 2 in tabular form.

DESCRIPTION OF THE PREFERRED EMBODIMENTS

FIG. 1 shows a motor vehicle 1 with its vehicular environment 3. The motor vehicle is fitted with an assistance system according to the invention. The assistance system includes at least one monitoring unit 4 monitoring the external space 3, in particular in the direction of travel 2 of the motor vehicle 1. Suitable monitoring units 4 are preferably units having 2D or 3D image recording sensors such as in mono, stereo and/or time-of-flight cameras, ultrasound sensors, radar sensors, lidar sensors and/or suchlike. In the monitored external space 3 of the motor vehicle 1, a warning zone 10 is defined on each side of the lane 14, said warning zone 10 being delimited by an earliest warning line 11 and a latest warning line 12 encompassing the respective lane marking or, as the case may be, boundary 20.

The principle of the invention is described below with reference to an image recording unit 4, which is preferably a camera. This is installed for example in the roof area of the motor vehicle 1 close to the interior mirror mounting (not shown) and has a horizontal aperture angle of approx. 50° and a vertical aperture angle of approx. 30°.

An image processing computer (IP computer) can be part of a central evaluation unit 5 and/or be integrated fully or partially in the housing of the camera 4. The camera sensor data is evaluated by means of the IP computer; for example, the lane markings 20 are detected and the position and angle of the vehicle 1 relative to the lane 14 and the curvature radius of the lane 14 calculated. The IP computer is connected to the vehicle for example via a CAN bus and according to the invention can preferably read out values such as speed, brake signal, turn signals, steering angle and, if present, evaluations of other sensors, such as "blind spot" camera, ACC radar and suchlike.

If the exceeding, by the motor vehicle 1, of a defined warning threshold 13—modifiable in terms of its sensitivity—lying within the warning zone 10 is detected by the evaluation unit 5, said evaluation unit 5 generates a warning signal for the data transmitted by the monitoring unit 4.

As described in the dependent claims, the sensitivity can depend on the most diverse parameters, for example also on the variability of the size of the warning zone 10 due to the changing positioning, according to situation, of the warning lines 11 and 12 delimiting said warning zone 10.

FIG. 2 shows the varying distance of the earliest warning line 11 from the lane boundary 20 as a function of the rate of departure V of the motor vehicle 1. FIG. 3 shows the corresponding variables plotted in FIG. 2 in the form of a table.

According to the invention the warning signal for a warning and/or an intervention in the steering are/is issued only as a function of further planned driver-adaptive conditions, as a result of which assistance systems according to the invention advantageously take account of the needs of the driver and to that extent are perceived as more convenient.

Compared to known assistance systems, an important improvement is provided with the present invention in so far as the taking into account of driver-adaptive conditions advantageously increases the acceptance of systems of this type and for the first time leads to economically interesting products.

We claim:

1. An assistance system for motor vehicles, the assistance system comprising:

at least one monitoring unit monitoring an external space external to a motor vehicle, the external space including warning zones with one warning zone being defined on each side of a driving lane, each of the warning zones being delimited by an earliest warning line and a latest warning line encompassing a respective lane marking or a lane boundary; and an evaluation unit receiving data transmitted by said monitoring unit, said evaluation unit generating a warning signal for at least one warning selected from the group consisting of an acoustic warning, a visual warning and a haptic warning, and/or a steering intervention if said evaluation unit detects that a defined warning threshold lying within the warning zone being exceeded, the warning signal being issued only as a function of further planned driver-adaptive conditions;

wherein a position of the defined warning threshold can be adjusted individually to match a defined driver; and wherein a position of the motor vehicle on the driving lane is measured over an adjustable period of time and evaluated statistically such that conclusions can be derived about a typical behavior of a driver and as a function thereof a starting position and/or any changes to the position of the defined warning threshold can be set.

2. The assistance system according to claim 1, wherein said evaluation unit is programmed to suppress an issuance of the warning signal during a driver-adjustable period of time after a start of a journey.

3. The assistance system according to claim 1, wherein said evaluation unit is programmed to suppress an issuance of the warning signal during a period of time dependent on a time of day.

4. The assistance system according to claim 1, wherein a position of the defined warning threshold is moved from a defined starting position over time in a direction of the earliest first warning line.

5. The assistance system according to claim 4, wherein the position of the defined warning threshold is moved after an adjustable period of time.

6. The assistance system according to claim 4, wherein the position of the defined warning threshold is moved continuously over a set period of time.

7. The assistance system according to claim 4, wherein an end position of a placing of the defined warning threshold is a defined threshold position that can be adjusted by a driver or a vehicle manufacturer.

8. The assistance system according to claim 2, wherein a period of time for suppression of the warning signal or, a moving of a position of the defined warning threshold is dependent on weather and/or lighting conditions.

9. The assistance system according to claim 8, wherein said monitoring unit has a camera system with an exposure controller, wherein the weather is assessed on a basis of a time of day and/or camera parameters set by said exposure controller, including at least one of exposure time, gain and shape of a characteristic curve.

10. The assistance system according to claim 4, wherein the defined starting position and/or a change in position of the defined warning threshold is moved as a function of a calendar date.

11. The assistance system according to claim 4, wherein the position of the defined warning threshold is moved as a function of an activation of a windshield wiper lever or of a signal from a rain sensor.

12. The assistance system according to claim 1, wherein a number of times the defined warning threshold is exceeded, per defined time unit, is measured and the warning signal issues only if a further threshold is exceeded.

13. The assistance system according to claim 12, wherein each time the defined warning threshold or the further threshold is exceeded, a position of the defined warning threshold is moved in a direction of the earliest first warning line.

14. The assistance system according to claim 1, wherein said evaluation unit has a memory, individual data values are stored in said memory and driver-specific parameterization is performed following identification of the driver.

15. The assistance system according to claim 14, wherein a driver identification is checked on a basis of a key used, a fingerprint and/or by face recognition.

16. The assistance system according to claim 1, wherein a starting position of the defined warning threshold depends on a width of the driving lane being driven in.

17. The assistance system according to claim 1, wherein a starting position of the defined warning threshold depends on a type of road driven on.

18. The assistance system according to claim 1, wherein said monitoring unit has an apparatus selected from the group consisting of cameras and sensors being provided for monitoring a side area near the motor vehicle, and a position of the predefined warning threshold is changed as a function thereof.

19. The assistance system according to claim 1, wherein vehicles ahead and their distance and/or their speed relative to the motor vehicle fitted with the assistance system are detected.

20. The assistance system according to claim 19, wherein an issuing of the warning signal is suppressed if an overtaking maneuver is detected and/or if the assistance system motor vehicle performs a maneuver to get back into the driving lane.

21. The assistance system according to claim 1, further comprising sensors for detecting signs of tiredness in a driver, and a position of the predefined warning threshold is modified and/or an issuing of a warning is activated as a function thereof.

22. The assistance system according to claim 1, wherein an issuing of the warning signal for the acoustic warning is suppressed if a hands free device is activated.

23. The assistance system according to claim 1, wherein only warning signals for the visual warnings are issued if a hands free device is activated.

24. The assistance system according to claim 1, wherein an issuing of the warning is suppressed if operation of a telephone, onboard computer, radio, air conditioning system or other more complex operations is or are detected.

25. The assistance system according to claim 1, wherein a radius of a curve ahead being detected and/or estimated by use of driving dynamics models, and an issuing of the warning is suppressed if a negotiation of a curve by the motor vehicle is detected.

26. The assistance system according to claim 1, wherein said at least one monitoring unit monitors the external space in a direction of travel of the motor vehicle.

27. The assistance system according to claim 12, wherein the defined time unit is per minute.

* * * * *